US010033819B2

(12) United States Patent
Thanayankizil

(10) Patent No.: US 10,033,819 B2
(45) Date of Patent: Jul. 24, 2018

(54) OPERATING A VEHICLE WIRELESS ACCESS POINT TO SELECTIVELY CONNECT TO WIRELESS VEHICLE DEVICES

(71) Applicant: GM Global Technology Operations LLC, Detroit, MI (US)

(72) Inventor: Lakshmi V. Thanayankizil, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/222,580

(22) Filed: Jul. 28, 2016

(65) Prior Publication Data
US 2018/0034919 A1    Feb. 1, 2018

(51) Int. Cl.
| | |
|---|---|
| H04H 40/00 | (2009.01) |
| H04M 3/00 | (2006.01) |
| H03M 3/00 | (2006.01) |
| H04M 1/00 | (2006.01) |
| H04L 29/08 | (2006.01) |
| H04W 76/02 | (2009.01) |
| H04W 76/06 | (2009.01) |
| H04W 76/10 | (2018.01) |
| H04W 76/30 | (2018.01) |

(52) U.S. Cl.
CPC .............. *H04L 67/16* (2013.01); *H04L 67/12* (2013.01); *H04W 76/02* (2013.01); *H04W 76/06* (2013.01); *H04W 76/10* (2018.02); *H04W 76/30* (2018.02)

(58) Field of Classification Search
CPC ..... H04W 4/001; H04W 28/16; H04W 48/14; H04W 48/13; H04W 48/12; H04W 76/10
USPC ...................... 455/418, 557, 3.06, 414.1, 425
See application file for complete search history.

(56) References Cited

U.S. PATENT DOCUMENTS

| | | | | |
|---|---|---|---|---|
| 7,079,015 | B2 * | 7/2006 | Gibeau | B60R 16/0315 340/425.5 |
| 8,023,451 | B2 * | 9/2011 | Swann | H04W 48/12 370/328 |
| 8,055,258 | B2 * | 11/2011 | Hwang | H04W 48/14 455/3.06 |
| 8,422,431 | B2 * | 4/2013 | Swann | H04W 48/12 370/328 |
| 2002/0010603 | A1 * | 1/2002 | Doi | G06Q 10/02 705/5 |
| 2005/0221858 | A1 * | 10/2005 | Hoddie | H04W 28/16 455/557 |
| 2006/0035634 | A1 * | 2/2006 | Swann | H04W 48/12 455/425 |

(Continued)

*Primary Examiner* — William C Cumming
(74) *Attorney, Agent, or Firm* — David Willoughby; Reising Ethington P.C.

(57) ABSTRACT

A system and method for operating a wireless device installed in a vehicle. The method carried out by the system includes: determining one or more services utilized by the wireless device; receiving a signal indicating one or more services currently available from a wireless access point installed in the vehicle; determining if the one or more services utilized by the wireless device are currently available from the wireless access point; and based on the determinations deciding whether to connect the wireless device to the wireless access point or, if already connected, whether to disconnect so as to free up the wireless access point for use by other wireless devices on the vehicle.

15 Claims, 2 Drawing Sheets

(56) References Cited

U.S. PATENT DOCUMENTS

| | | | | |
|---|---|---|---|---|
| 2007/0093202 A1* | 4/2007 | Hwang | ................ | H04W 48/14 |
| | | | | 455/3.06 |
| 2012/0034909 A1* | 2/2012 | Hwang | ................ | H04W 48/14 |
| | | | | 455/414.1 |
| 2014/0248863 A1* | 9/2014 | Golsch | ................ | H04W 4/001 |
| | | | | 455/418 |
| 2018/0034919 A1* | 2/2018 | Thanayankizil | ...... | H04W 76/10 |

* cited by examiner

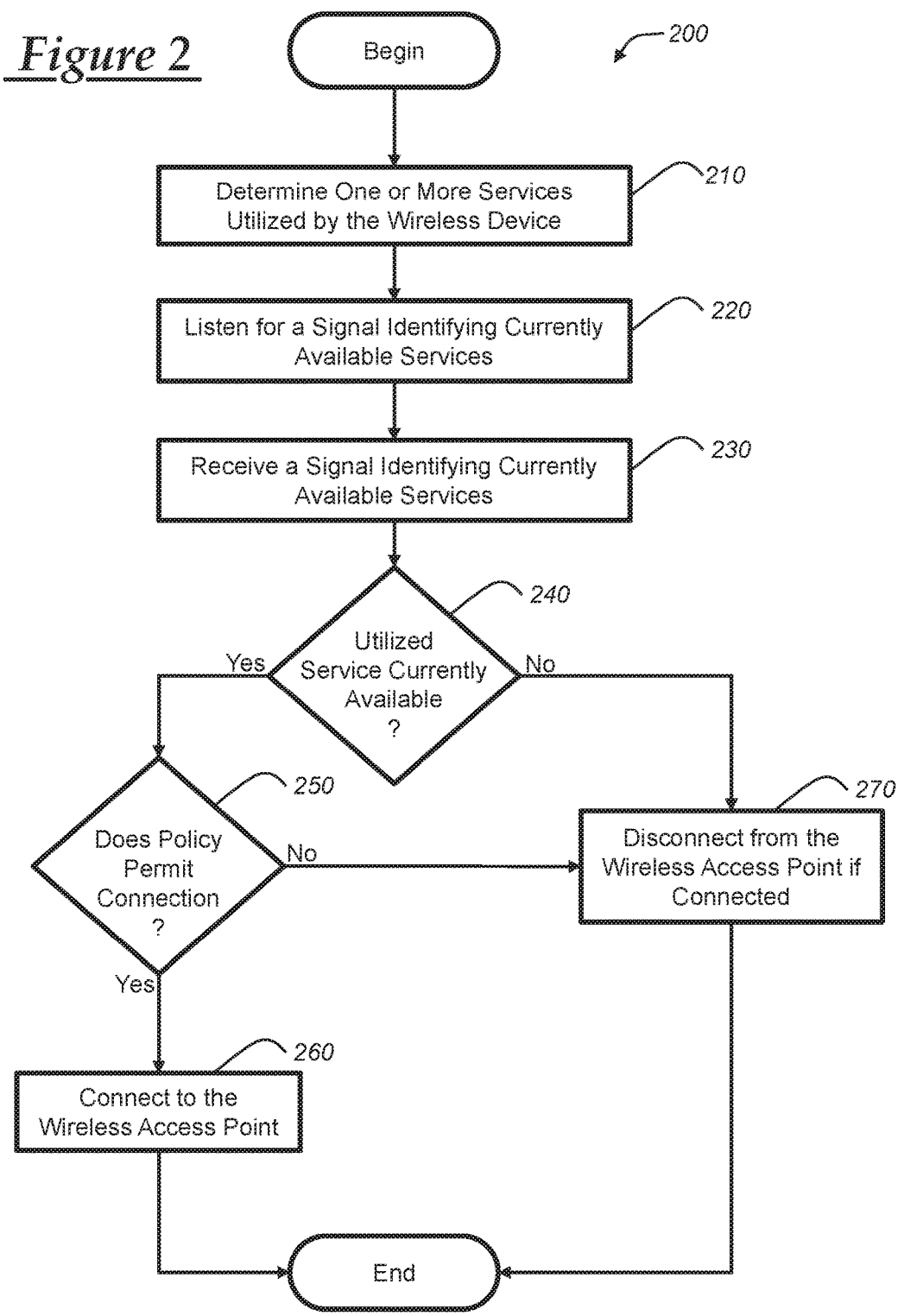

OPERATING A VEHICLE WIRELESS ACCESS POINT TO SELECTIVELY CONNECT TO WIRELESS VEHICLE DEVICES

TECHNICAL FIELD

The present invention relates generally wireless communication in a vehicle and, more specifically, to operation of wireless devices and wireless access point(s) included in a vehicle.

BACKGROUND

Wireless technologies are becoming more advanced and are increasingly being used to replace wired communication systems. Many vehicles now come equipped with a wireless access point or at least the means to install an aftermarket wireless access point. The wireless access point may provide a local network for wireless devices and/or may be coupled to a telematics unit, or other remote network access device, to provide access to the Internet and other remote networks. Certain wireless devices may need to use the wireless access point to provide information to a vehicle head unit, such as an infotainment or body control module, obtain information therefrom, and/or otherwise use the wireless access point to carry out one or more of their operations. Most wireless access points contain a limit of client devices they may connect to and also include other limitations, such as the amount of broadband supported. It may therefore be desirable to connect and disconnect certain wireless devices in accordance with how pertinent the operation of certain services utilized by the wireless devices may be at any given time.

SUMMARY

In accordance with an embodiment of the invention, there is provided a method for use with a wireless device installed in a vehicle. The method comprises carrying out the following steps using the wireless device:

(a) determining one or more services utilized by the wireless device;

(b) receiving a signal indicating one or more services currently available from a wireless access point installed in the vehicle;

(c) determining if the one or more services utilized by the wireless device are currently available from the wireless access point by comparing the one or more services utilized by the wireless device with the one or more services currently available from the wireless access point;

(d) when at least one of the one or more services of the wireless device are currently available from the wireless access point and when the wireless device is not connected to the wireless access point, then connecting to the wireless access point; and (e) when none of the one or more services of the wireless device are currently offered at the wireless access point and when the wireless device is connected to the wireless access point, then disconnecting from the wireless access point.

In accordance with another embodiment of the invention, there is provided a method of operating a vehicle, wherein the method is carried out by a vehicle that includes a wireless access point and a plurality of wireless devices installed in the vehicle, the method comprising:

(a) periodically broadcasting a signal indicating one or more services currently available from the wireless access point;

(b) determining one or more services utilized by each of the plurality of wireless devices;

(c) determining, for each of the plurality of wireless devices, whether at least one of the utilized services are currently available from the wireless access point; and (d) operating the wireless access point and the plurality of wireless devices according to a service priority policy, wherein the service priority policy is based on the determinations made in step (c).

In accordance with yet another embodiment of the invention, there is provided a vehicle wireless device comprising: a transceiver capable of receiving and transmitting wireless signals; a computer-readable medium; and an electronic processing unit coupled to the transceiver and computer-readable medium. The processor operates under control of a program stored on the computer-readable medium to listen for a wireless signal indicating services currently available from a wireless access point using the transceiver, process the wireless signal to obtain the currently available services, obtain at least one service utilized by the vehicle wireless device from the computer-readable medium, and connect to the wireless access point based on whether any of the at least one services utilized are currently available services.

BRIEF DESCRIPTION OF THE DRAWINGS

One or more embodiments of the invention will hereinafter be described in conjunction with the appended drawings, wherein like designations denote like elements, and wherein:

FIG. 2 is an embodiment of a method for operating a wireless device installed in a vehicle.

DETAILED DESCRIPTION OF THE ILLUSTRATED EMBODIMENT(S)

Figure 1:
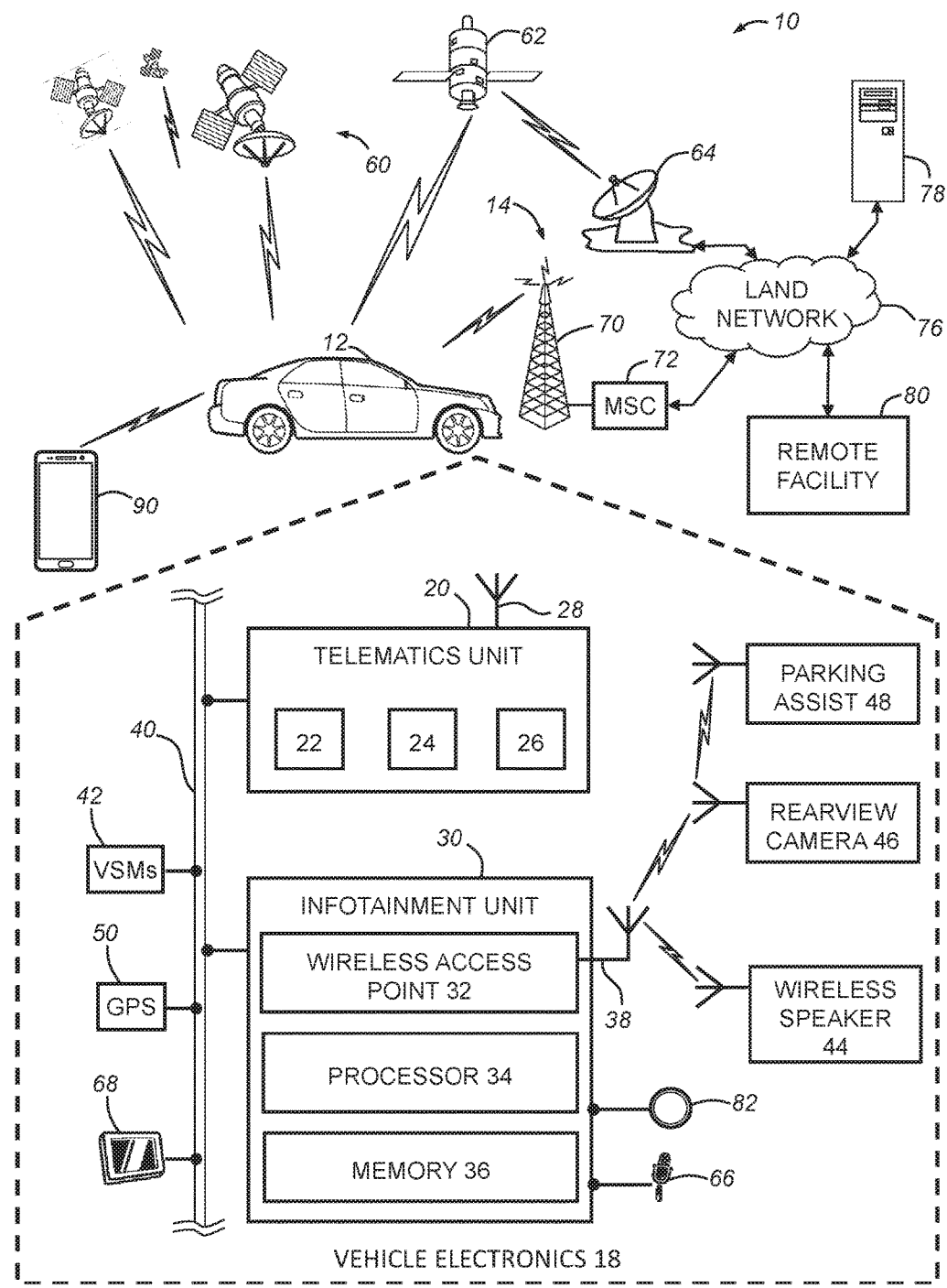
FIG. 1 is a block diagram depicting an embodiment of a communications system that is capable of utilizing the method disclosed herein.

The method described below is carried out by a wireless device installed in a vehicle that is in communication with a wireless access point installed in the vehicle. The method may, in one embodiment, provide a convenient way to connect wireless devices to the wireless access point when services utilized by the wireless devices are currently available from the wireless access point. For example, when the vehicle's transmission is in reverse, the vehicle may inform the wireless access point to connect to wireless devices that may aid an operator or the vehicle in operating the vehicle in reverse. The wireless access point may indicate this through broadcasting one or more services as being currently available. In one example, one of the services may be a rearview video service that is utilized by a rearview camera. The rearview camera, through listening for and receiving a wireless signal from the wireless access point or other wireless device (e.g., a signal forwarded by another wireless device that was originally from the wireless access point), may then realize that the rearview video service is currently available from the wireless access point and, therefore, the rearview camera will request a connection and/or connect to the wireless access point. In another example, the wireless devices may connect and/or disconnect from the wireless access point through implementation of a policy, such as a service priority policy.

Communications System—

With reference to FIG. 1, there is shown an operating environment that comprises a mobile vehicle communications system 10 and that can be used to implement the method disclosed herein. Communications system 10 generally includes a vehicle 12, one or more wireless carrier systems 14, a land communications network 76, a computer 78, a remote facility 80, and a mobile device 90. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 18 are shown generally in FIG. 1 and include a telematics unit 20, an infotainment unit 30 which includes a wireless access point 32, parking assist module 48, rearview camera 46, and wireless speaker 44, as well as a number of vehicle system modules (VSMs) 42 and other modules and devices. Some of these devices can be connected directly to the telematics unit and/or infotainment unit, such as microphone 66 and pushbutton(s) 82, whereas others are indirectly connected using one or more network connections, such as a communications bus 40, an entertainment bus, or a wireless access point, such as WAP 32. Examples of suitable network connections include a controller area network (CAN), a media oriented system transfer (MOST), a local interconnection network (LIN), a local area network (LAN), and other appropriate connections such as Ethernet or others that conform with known ISO, SAE, and IEEE standards and specifications, to name but a few.

Telematics unit 20 can be an OEM-installed (embedded) or aftermarket device that is installed in the vehicle and that enables wireless voice and/or data communication over wireless carrier system 14 and via wireless networking. This enables the vehicle to communicate with remote facility 80, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 20 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the remote facility 80) and data communication (e.g., to provide GPS location data or vehicle diagnostic data to the remote facility 80), the system can utilize a single call over a voice channel and switch as needed between voice and data transmission over the voice channel, and this can be done using techniques known to those skilled in the art.

According to one embodiment, telematics unit 20 utilizes cellular communication according to GSM, CDMA, or LTE standards and thus includes a standard cellular chipset 22 for voice communications like hands-free calling, a wireless modem for data transmission, an electronic processing device 24, one or more digital memory devices 26, and a dual antenna 28. It should be appreciated that the modem can either be implemented through software that is stored in the telematics unit and is executed by processor 24, or it can be a separate hardware component located internal or external to telematics unit 20. The modem can operate using any number of different standards or protocols such as LTE, EVDO, CDMA, GPRS, and EDGE.

Processor 24 can be any type of device capable of processing electronic instructions including microprocessors, microcontrollers, host processors, controllers, vehicle communication processors, and application specific integrated circuits (ASICs). It can be a dedicated processor used only for telematics unit 20 or can be shared with other vehicle systems. Processor 24 executes various types of digitally-stored instructions, such as software or firmware programs stored in memory 26, which enable the telematics unit to provide a wide variety of services. For instance, processor 24 can execute programs or process data to carry out at least a part of the method discussed herein. Memory 26 may a volatile or non-volatile computer-readable medium accessible by the processor 24.

Telematics unit 20 can be used to provide a diverse range of vehicle services that involve wireless communication to and/or from the vehicle. Such services include: turn-by-turn directions and other navigation-related services that are provided in conjunction with the GPS-based vehicle navigation module; autonomous or semi-autonomous cruise control; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module 30 and is stored for current or later playback. The above-listed services are by no means an exhaustive list of all of the capabilities of telematics unit 20, but are simply an enumeration of some of the services that the telematics unit is capable of offering. Furthermore, it should be understood that at least some of the aforementioned modules could be implemented in the form of software instructions saved internal or external to telematics unit 20, they could be hardware components located internal or external to telematics unit 20, or they could be integrated and/or shared with each other or with other systems located throughout the vehicle, to cite but a few possibilities. In the event that the modules are implemented as VSMs 42 located external to telematics unit 20, they could utilize a vehicle bus to exchange data and commands with the telematics unit.

Infotainment unit 30 is included as part of vehicle electronics 18 and can be an OEM-installed (embedded) or aftermarket device that is installed in the vehicle. Infotainment unit 30 may control and/or provide numerous functions for the vehicle and is shown to include wireless access point (WAP) 32, processor 34, and memory 36. Infotainment unit 30 may be connected to a bus 40 and may control numerous vehicle modules and/or components, such as wireless speaker 44, GPS 50, visual display 68 and/or other VSMs 42. Additionally, infotainment unit 30 may be directly connected to one or more devices or components, such as, for example, microphone 66, button 82, and telematics unit 20, as shown. Infotainment unit 30 may also receive information or data from any of the components of the vehicle to which it may be communicatively connected to, including non-vehicle electronics that it may connect to, such as via WAP 32. The infotainment unit is shown to include a processor 34 and memory 36, which allow the unit to process and store information or data. Processor 34 can be any type of device capable of processing electronic instructions and, for examples, see the description above with respect to processor 24 of telematics unit 20. Similarly, memory 36 is analogous to memory 26 included in telematics unit 20 and may be used to store data received, generated, or otherwise obtained by infotainment unit 30, such as via WAP 32.

Vehicle wireless access point (WAP) 32 is shown to be included in infotainment unit 30; however, WAP 32 may be incorporated into a different module, such as telematics unit 20, or may be a stand-alone module. As used herein a "wireless access point" (abbreviated "WAP") is a hardware and software device that communicates using short range wireless communication (SRWC) with client devices to provide the client devices with data access to local or remote network(s) via a wired and/or wireless connection from the WAP to a public or private network such as the Internet. The vehicle WAP 32 may be coupled to a router or other network access device, such as telematics unit 20, which will allow it to connect to remote network(s) (e.g., computer 78 via cellular carrier system 14 and land network 76) thereby providing remote network access to one or more client devices to which it connects (e.g., mobile device 90, wireless speakers 44, rearview camera 46, parking assist 48). As shown, WAP 32 may include an antenna 38 to improve its reception and/or transmission of wireless signals and, in other embodiments, may include multiple antennas depending on, for example, the specific wireless protocol used (e.g., IEEE 802.11n). Additionally, WAP may include a dual band transceiver that allows it to communicate on multiple wireless channels, such as the 2.4 GHz and 5 GHz frequency bands used by IEEE 802.11 (e.g., 802.11b/g/n and 802.11a/h/j/n/ac).

WAP 32 can be configured to communicate wirelessly according to one or more wireless protocols, including short range wireless communication (SRWC) such as any of the IEEE 802.11 protocols, WiMAX, ZigBee™, Wi-Fi direct, Wi-Fi Aware, BLUETOOTH™, or near field communication (NFC). When used for packet-switched data communication such as TCP/IP, the telematics unit can be configured with a static IP address or can set up to automatically receive an assigned IP address from another device on the network such as a router or from a network address server.

Vehicle 12 includes a plurality of wireless devices, such as parking assist 48, rearview camera 46, and wireless speakers 44 (only one shown). As used herein, "wireless device" is an electronic device, component, module, system, or entity that includes circuitry for wirelessly communicating data via a wireless protocol. Such wireless protocols include any of the IEEE 802.11, as described above with respect to WAP 32, or any other wireless protocol known to those skilled in the arts. The wireless devices, such as parking assist 48, rearview camera 46, and wireless speakers 44 may contain one or more transceivers and/or antennas and may communicate with other vehicle modules or devices via use of these components. Additionally, any of the wireless devices may be coupled to a wired communications bus, such as bus 40.

Vehicle 12 can include vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by a communications bus to the other VSMs, as well as to the telematics unit 20 or infotainment unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 18 also includes a number of vehicle user interfaces that provide vehicle occupants with a means of providing and/or receiving information, including microphones 66, pushbuttons 82, a wireless speaker 44, and a visual display 68. As used herein, the term "vehicle user interface" broadly includes any suitable form of electronic device, including both hardware and software components, which is located on the vehicle and enables a vehicle user to communicate with or through a component of the vehicle. Microphone 66 may provide audio input to the infotainment unit to enable the driver or other occupant to provide voice commands and carry out hands-free calling via the wireless carrier system 14. For this purpose, it can be connected to an on-board automated voice processing unit utilizing human-machine interface (HMI) technology known in the art. One or more pushbutton(s) 82 can allow manual user input into the infotainment unit 30 to initiate wireless telephone calls and provide other data, response, or control input. Separate pushbuttons can be used for initiating emergency calls versus regular service assistance calls to the remote facility 80. Wireless speakers 44 provides audio output to a vehicle occupant and can be a dedicated, stand-alone system or part of the primary vehicle audio system. Visual display 68, such as a touch screen on the instrument panel or a heads-up display reflected off of the windshield, can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72 (only one shown), as well as any other networking components required to connect wireless carrier system 14 with land network 76. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 76 may be a conventional land-based telecommunications network that is connected to one or more landline telephones and connects wireless carrier system 14 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof. Furthermore, remote facility 80 need not be connected via land network 76, but could include wireless telephony equipment so that it can communicate directly with a wireless network, such as wireless carrier system 14.

Computer 78 can be one of a number of computers accessible via a private or public network such as the Internet. Each such computer 78 can be used for one or more purposes, such as a web server accessible by the vehicle via telematics unit 20 and wireless carrier 14. Other such accessible computers 78 can be, for example: a service center computer where diagnostic information and other vehicle data can be uploaded from the vehicle via the telematics unit 20; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or remote facility 80, or both. A computer 78 can also be used for providing Internet connectivity such as DNS services or as a network address server that uses DHCP or other suitable protocol to assign an IP address to the vehicle 12.

Remote facility 80 is designed to provide the vehicle electronics 18 with a number of different system back-end functions. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as 882.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

Mobile device 90 is a non-vehicle device, meaning that it is not a part of vehicle 12 or vehicle electronics 18. The mobile device includes: hardware, software, and/or firmware enabling cellular telecommunications and/or short range wireless communication (SRWC), as well as other wireless device functions and applications. The hardware of mobile device 90 comprises a processor and memory for storing the software, firmware, etc. This memory may include volatile RAM or other volatile memory, as well as a non-transitory computer readable medium that stores some or all of the software needed to carry out the various external device functions discussed herein. The mobile device processor and software stored in the memory enable various software applications, which may be preinstalled or installed by the user (or manufacturer) (e.g., having a software application or graphical user interface (GUI)). This may include an application that allows a vehicle user to communicate with vehicle 12 and/or to control various aspects or functions of the vehicle—e.g., among other things, allowing the user to remotely lock/unlock vehicle doors, turn the vehicle ignition on or off, check the vehicle tire pressures, fuel level, oil life, etc. The application may also be used to enable the user of device 90 to view information pertaining to the vehicle (e.g., the current location of the vehicle, whether the vehicle is locked or unlocked) and/or pertaining to an account associated with the user or vehicle. Wireless device 90 is shown as a smartphone having cellular telephone capabilities. In other embodiments, device 90 may be a tablet, laptop computer, or any other suitable device. In addition, the application may also allow the user to connect with the remote facility 80 or call center advisors at any time.

Method—

Turning now to FIG. 2, there is shown an embodiment of a method for operating a wireless device installed in a vehicle. Method 200 is carried out by a wireless device installed in the vehicle and begins with step 210. In one embodiment, the method is carried out by rearview camera 46. In the first step, the wireless device determines one or more services utilized by itself. As used herein, "service" means any operation that may be carried out by a wireless device of vehicle 12 or any operation that vehicle 12 may direct a wireless device to carry out or any vehicle function or operation that may be carried out or assisted by a wireless device. For example, in the case that the wireless device is the rearview camera 46, the services utilized may include a rearview video service which provides rearview video output. In the case that the wireless device is wireless speaker 44, the services utilized may include audio playback of the radio, teleconferencing, etc. In the case that the wireless device is parking assist 48, the services utilized may include a rearview video service, providing sensor data, operating an indicator light, etc.

The wireless device may determine which services it utilizes by querying a memory device included therein or may obtain an indication of the services it utilizes from another device, such as telematics unit 20. Generally, a wireless device will include a processing device and a memory device such that it may store and recall data into and from its memory device and process data using its processing device. Such processing and memory device may be coupled to a transceiver also include therein. The rearview camera 46, for example, may acquire an indication that it utilizes the services of capturing video, parallel parking assist, and reverse driving assist.

In step 220, after the wireless device acquires the service(s) that it utilizes, the wireless device may then listen for a signal that identifies services currently available. The signal may also include information pertaining to the wireless access point and/or information pertaining to devices connected to the wireless access point. Such information could include, for example, the number of client devices the wireless access point can connect to, the number of wireless devices the wireless access point is currently connected to, an identifier associated with the wireless devices the wireless access point is currently connected to, the services utilized by the wireless devices that the wireless access point is currently connected to, the amount of data or broadband used by each of the wireless devices (e.g., a historical average amount, an estimated amount, a current amount), etc. Other information pertaining to the vehicle may be included in the signal, such as a current state of the vehicle or vehicle modules, environmental conditions in and/or around the vehicle, and/or attributes or properties of the vehicle.

In one embodiment of step 220, the rearview camera may listen for signals transmitted by another wireless device or a wireless access point through use of a transceiver and/or antenna. Rearview camera 46 may listen on specific WiFi channels, over certain frequency ranges, or over other wireless communication channels, such as those used by any of the IEEE 802.11 protocols. The signal may be a beacon signal sent from the WAP 32.

In another embodiment, the wireless device may communicate with a second wireless device using peer-to-peer (P2P) communications. In one example, the P2P communications may be those employed through the WiFi Aware protocol. The second wireless device may be in communication with the wireless access point and, thus, may communicate information received therefrom, such as the currently available services, with the wireless device. For example, in the event where parking assist 48 is the wireless device carrying out method 200, parking assist 48 may communicate with rearview camera 46 using the WiFi Aware protocol to determine which services are currently available from the wireless access point. Parking assist 48 and rearview camera 46 may each have an application installed thereon that may be used with the WiFi Aware protocol to enable P2P communications between one another without use of a WAP, such as WAP 32.

In step 230, the wireless device receives a signal identifying one or more services currently available from the wireless access point. The signal may be received via any of the communication means discussed with respect to step 220. After receiving the signal, the wireless device may, for example, process the signal. The signal may be decoded, decrypted, and/or otherwise processed as to obtain the one or more services currently available from the WAP 32. Other information received may include information relating to a policy used by the vehicle wireless system in determining which wireless devices should currently be connected to the wireless access point. This policy information may be combined with other information included in the signal or available at the wireless device to make the determination shown in step 250. Such information may include or be used to generate a priority rank or status.

After the signal is processed, data may relating to the signal may be stored in memory of the wireless device. Such data may include metadata concerning the signal, information contained in the signal (e.g., the currently available services), and/or other information relating to the signal or wireless device. It should be appreciated that, in other embodiments, the wireless device may listen for and receive a signal indicating the currently available services before and/or during step 210. In such a case, the wireless device may carry out steps 210 in response to completing steps 220 and 230. In any event, step 240 is then carried out.

In step 240, the wireless device determines whether at least one of the services it utilizes are currently available from the wireless access point. This step may be carried out by comparing a list of services the device utilized, such as those realized in step 210, to a list of services currently available from the WAP, such as those realized in step 220. A processing device included in the wireless device may carry out this step, for example. Alternatively, another device or module that is in communication with the wireless device may carry out this step. In one embodiment, rearview camera 46 can evaluate the services utilized and the currently available services to determine which services utilized are currently available from WAP 32. Each of the services may be identified through an identifier, such as a unique string or bit sequence. In any event, if it is determined that at least one of the services utilized by the wireless device is a currently available service, then the method continues to step 250; otherwise, the method continues to step 270.

In step 250, it is determined whether a policy permits the connection of the wireless device to the wireless access point. The "policy" may be any predetermined rule(s) that are used to determine whether a wireless device is permitted to connect or be connected to a wireless access point. The policy may be a "service priority policy" wherein each of the services that may be offered from the wireless access point are prioritized (e.g., ranked in order of their importance to the current or desired vehicle operation or functionality) based on how essential each of the services are at a given time. For example, a rearview camera service may have a priority of "1" (i.e. the highest priority in one example) when the vehicle's transmission is in reverse and a radio playback service may have a priority of "5" (i.e. a lesser priority) during this time. However, when the vehicle's transmission is then switched into drive, the radio playback may have a priority rank of "1" and the rearview camera may have a priority rank of "N/A" (since there is no current use for it and/or it is not "currently available" from the wireless access point).

In prioritizing the services and/or in determining whether the policy currently permits connection of a wireless device to the wireless access point, certain details pertaining to the wireless access point, the services, and/or the wireless devices may be taken into account. For example, the total number of connections to client devices that the wireless access point supports may be considered. Additionally, the amount of required, desired, and/or average amount of broadband (i.e. download/upload bit rate) used by the service and/or the wireless device may be taken into account into the prioritization. In one embodiment, the rearview camera may receive, in step 230, policy information regarding the currently available services. Then, this information may be used, in conjunction with other vehicle information, as to whether the rearview camera should connect to the wireless access point 32. If it is determined that the policy permits the connection of the wireless device to the wireless access point, then the method proceeds to step 250; otherwise, the method proceeds to step 260.

In step 250, the wireless device connects to the wireless access point. This step may not be needed if the wireless device is already connected to the wireless access point and, in that case, the method may end. Otherwise, the wireless device may request a connection to the wireless access point through use of standard WiFi protocol, such as those used in IEEE 802.11b/g/n. WAP 32 and the wireless device may then carry out further communications such as those that may be necessary to establish a secure connection (e.g., communications involved in a three- or four-way wireless handshake). The method then ends.

In step 260, the wireless device disconnects from the wireless access point. This step may not be needed if the wireless device is not connected to the wireless access point and, in that case the method may end. Otherwise, the wireless device may suspend its communications with the wireless access point and/or send the wireless access point an indication that it is disconnecting or desires to disconnect therefrom. The method then ends.

After the method ends, the method may repeat again and/or may be carried out when the services currently offered by the wireless access point changes (e.g., when another service becomes available or when a service is no longer currently available).

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

The invention claimed is:

1. A method for use with a wireless device installed in a vehicle, wherein the method comprises carrying out the following steps using a wireless device:
   (a) determining one or more services utilized by the wireless device, including obtaining a service identifier for each of the one or more services utilized by the wireless device;
   (b) receiving a signal via a short-range wireless communications (SRWC) protocol indicating one or more services currently available from a wireless access point installed in the vehicle, wherein the signal includes a service identifier indicating the one or more services currently available from the wireless access point, and wherein the one or more services currently available from the wireless access point correspond to one or more vehicle functions;
   (c) determining whether the one or more services utilized by the wireless device are currently available from the wireless access point by comparing the one or more service identifiers of the services utilized by the wireless device with the one or more service identifiers of the services currently available from the wireless access point;
   (d) when it is determined that at least one of the one or more services of the wireless device are currently available from the wireless access point and when the wireless device is not connected to the wireless access point, then connecting to the wireless access point; and
   (e) when it is determined that none of the one or more services of the wireless device are currently offered at the wireless access point and when the wireless device is connected to the wireless access point, then disconnecting from the wireless access point.

2. The method of claim 1, wherein the signal is received the wireless access point installed in the vehicle.

3. The method of claim 1, wherein the signal received is a beacon signal that is periodically broadcasted from the wireless access point.

4. The method of claim 1, wherein the signal is received from another wireless device installed in the vehicle.

5. The method of claim 1, wherein the signal indicating one or more services currently available from the wireless access point includes information pertaining to the devices currently connected to the wireless access point and/or to information pertaining to the wireless access point.

6. The method of claim 5, further comprising the step of evaluating the information in the received signal according to a service priority policy to determine whether the wireless device should be connected to the wireless access point, wherein the evaluation is carried out regardless of whether or not the wireless device is connected to the wireless access point.

7. The method of claim 6, wherein step (d) comprises connecting to the wireless access point when it is determined that the wireless device should be connected to the wireless access point and wherein step (e) comprises disconnecting from the wireless access point when it is determined that the wireless device should not be connected to the wireless access point.

8. The method of claim 6, wherein the service priority policy includes ranking the one or more services currently available from the wireless access point in order of priority.

9. The method of claim 8, wherein the evaluating step further comprises comparing the priorities of the one or more services utilized by the wireless device to the the priorities of one or more services utilized by the devices connected to the wireless access point.

10. A method for wireless communication at a vehicle, wherein the method is carried out by the vehicle and wherein the vehicle includes a wireless access point and a plurality of wireless devices installed in the vehicle, the method comprising:
   (a) periodically broadcasting a signal indicating one or more services currently available from the wireless access point, wherein the signal includes information identifying the one or more services currently available from the wireless access point, and wherein the one or more services currently available from the wireless access point correspond to one or more vehicle functions;

(b) determining one or more services utilized by each of the plurality of wireless devices;

(c) determining, for each of the plurality of wireless devices, whether at least one of the utilized services are currently available from the wireless access point; and (d) operating the wireless access point and the plurality of wireless devices according to a service priority policy, wherein the service priority policy is based on the determinations made in step (c), and wherein the wireless access point connects or maintains a connection to at least one of the plurality of the wireless devices based on the service priority policy and the wireless access point disconnects or maintains a disconnection to at least one of the plurality of wireless devices based on the service priority policy.

11. The method of claim 10, wherein the operating step further comprises connecting and disconnecting any of the plurality of wireless devices to the wireless access point based on the service priority policy.

12. The method of claim 11, wherein the service priority policy includes prioritizing the services based on information pertaining to the wireless access point, information pertaining to a state of the vehicle, and/or information pertaining to the plurality of wireless devices.

13. The method of claim 10, wherein the signal is broadcasted from one of the plurality of wireless devices that are included in the vehicle.

14. The method of claim 13, wherein the wireless device that is broadcasting the signal is connected to the wireless access point via short-range wireless communications (SRWC).

15. A vehicle wireless device, comprising:
a transceiver capable of receiving and transmitting wireless signals;
a computer-readable medium; and
an electronic processing unit coupled to the transceiver and computer-readable medium, wherein said processor operates under control of a program stored on the computer-readable medium to:
listen for and receive a wireless signal indicating services currently available from a wireless access point using the transceiver, wherein the wireless signal includes a service identifier for each of the one or more services currently available from the wireless access point, and wherein the one or more services currently available from the wireless access point correspond to one or more vehicle functions;
process the wireless signal to obtain the currently available services;
obtain at least one service identifier of a service utilized by the vehicle wireless device from the computer-readable medium, and
connect to the wireless access point based on whether any of the at least one service identifiers of the services utilized corresponds to any of the service identifiers of the services that are currently available services.

* * * * *